Jan. 22, 1929.

A. J. SILVA 1,699,573

HAY FEEDING MACHINE

Filed April 13, 1927    4 Sheets-Sheet 2

INVENTOR
A. J. Silva
BY
ATTORNEY

Jan. 22, 1929.

A. J. SILVA 1,699,573

HAY FEEDING MACHINE

Filed April 13, 1927 4 Sheets-Sheet 3

INVENTOR

A. J. Silva

BY

ATTORNEY

Jan. 22, 1929.                     A. J. SILVA                     1,699,573
                                HAY FEEDING MACHINE
                              Filed April 13, 1927        4 Sheets-Sheet 4
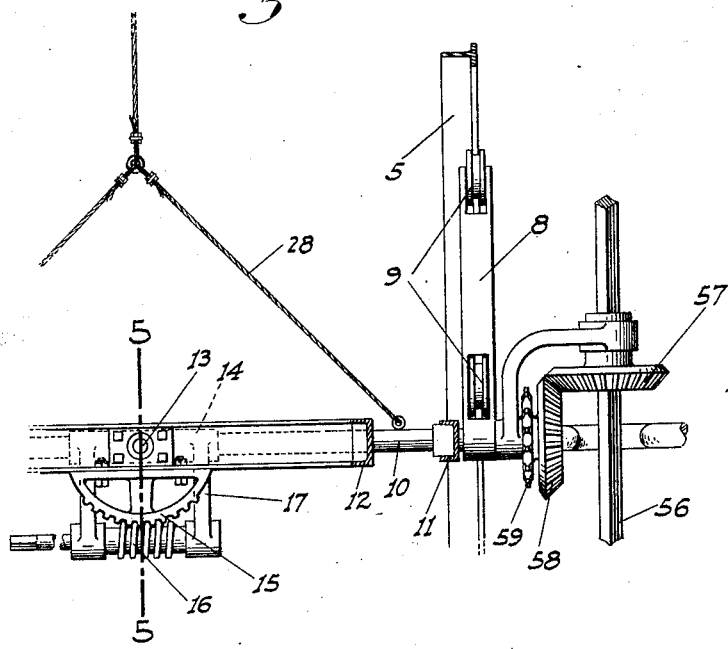
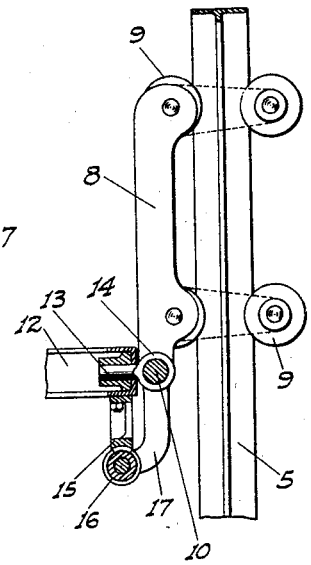
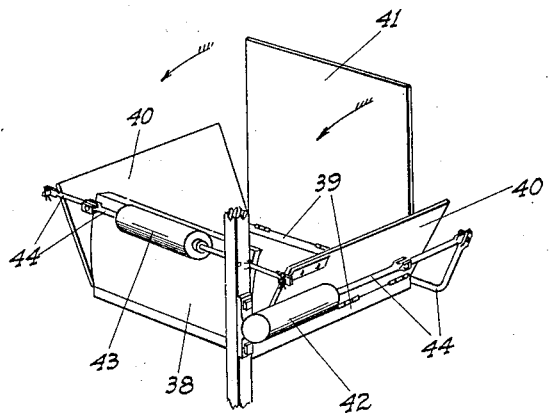
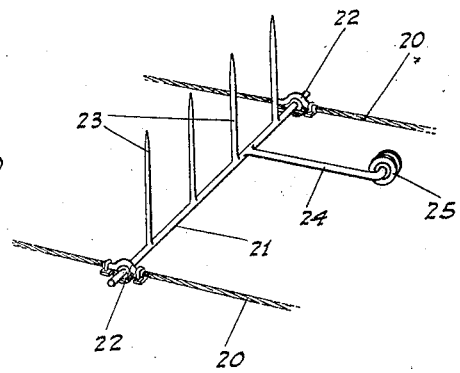
INVENTOR
A. J. Silva
BY
ATTORNEY Patented Jan. 22, 1929.

1,699,573

UNITED STATES PATENT OFFICE.

ANTONE J. SILVA, OF MILTON, CALIFORNIA.

HAY-FEEDING MACHINE.

Application filed April 13, 1927. Serial No. 183,322.

This invention relates to a device for the feeding of hay from the ground into a hay press, my principal object being to provide a machine for the purpose so constructed that hay can be taken from a stack of any reasonable height and other dimensions resting on the ground and fed thence to the press without the need of anyone having to manually move the hay into the sphere of action of the feeding means.

A further object of the invention is to provide in combination with a hay feeding means and a feed box arranged to communicate with the baling chamber of a hay press, a means for halting the feeding of the hay and at the same time automatically causing the door of the box to be pressed down so as to compress the hay already fed into the box and force the same into the baling chamber.

These objects I accomplish by means of such structure and relative arrangement of parts as will fully appear by a perusal of the following specification and claims.

In the drawings similar characters of reference indicate corresponding parts in the several views:

Fig. 4 is a fragmentary end view of the feed conveyor frame showing the driving, tilting and supporting means.

Fig. 5 is a cross section on the line 5—5 of Fig. 4.

Fig. 6 is a perspective elevation of the feed box detached.

Fig. 7 is a perspective elevation of a conveyor finger unit.

Figure 1:
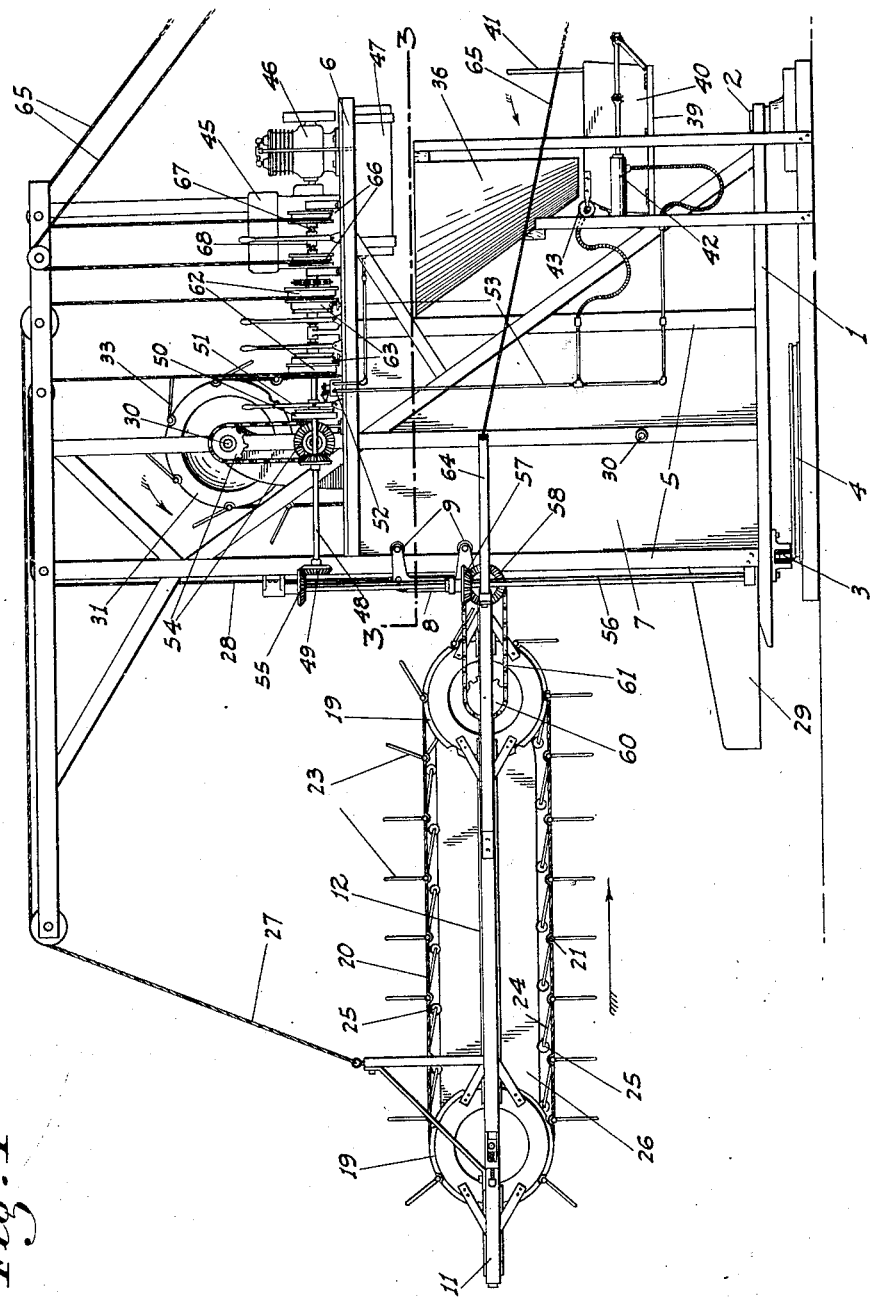
Fig. 1 is a side elevation of my improved hay feeding machine.

Referring now more particularly to the characters of reference on the drawings, the numeral 1 denotes a horizontal turntable structure mounted on a pivot 2 supported on the ground, the structure being additionally supported by rollers 3 riding on a track 4 which is concentric with said pivot. Projecting upwardly from the turntable is a frame which includes uprights 5 supporting a horizontal platform 6 some distance from the ground and also forming the corners of a rectangular chamber or enclosure 7. This chamber is offset some distance ahead of the pivot which is herein considered as being the rear end of the turntable structure.

Figure 2:
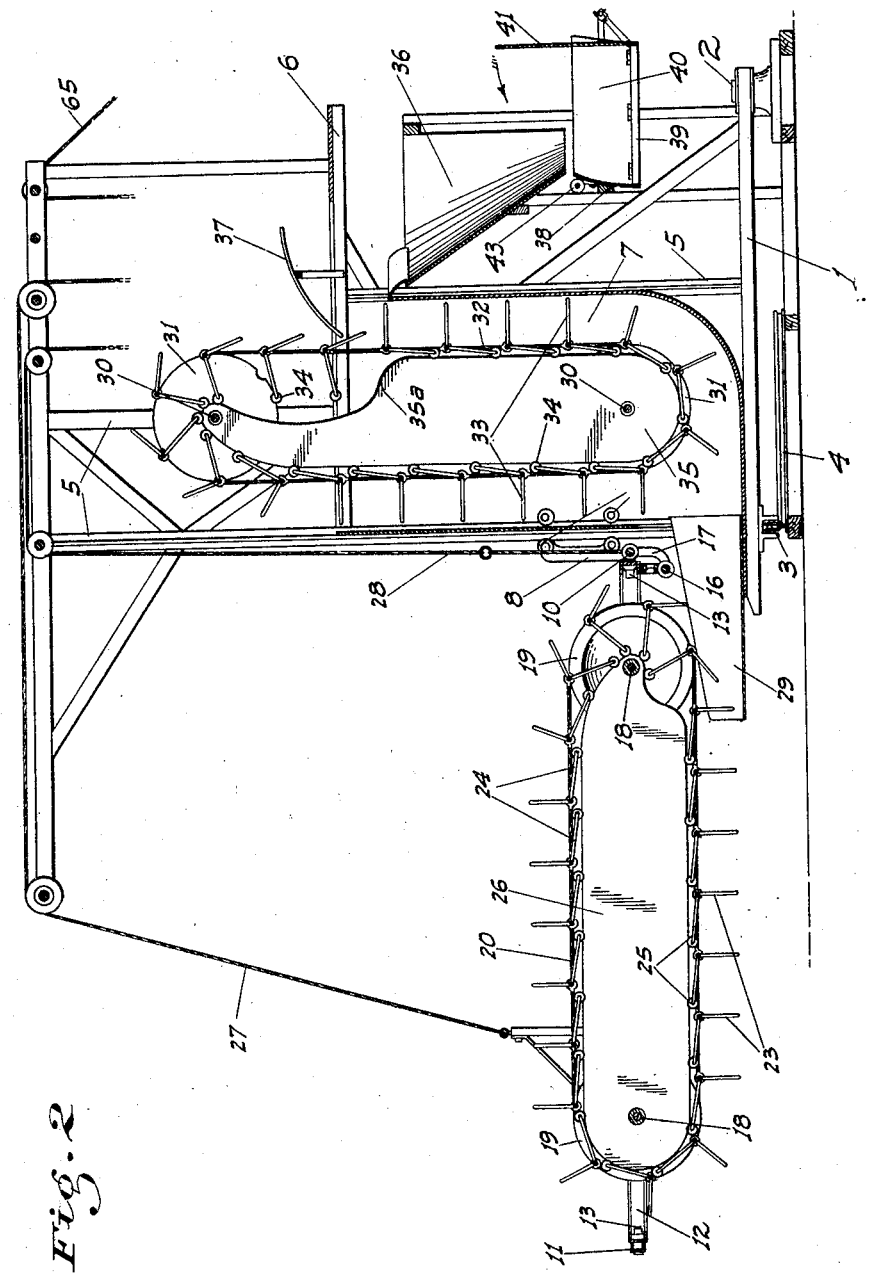
Fig. 2 is a sectional elevation of the same.
Figure 3:
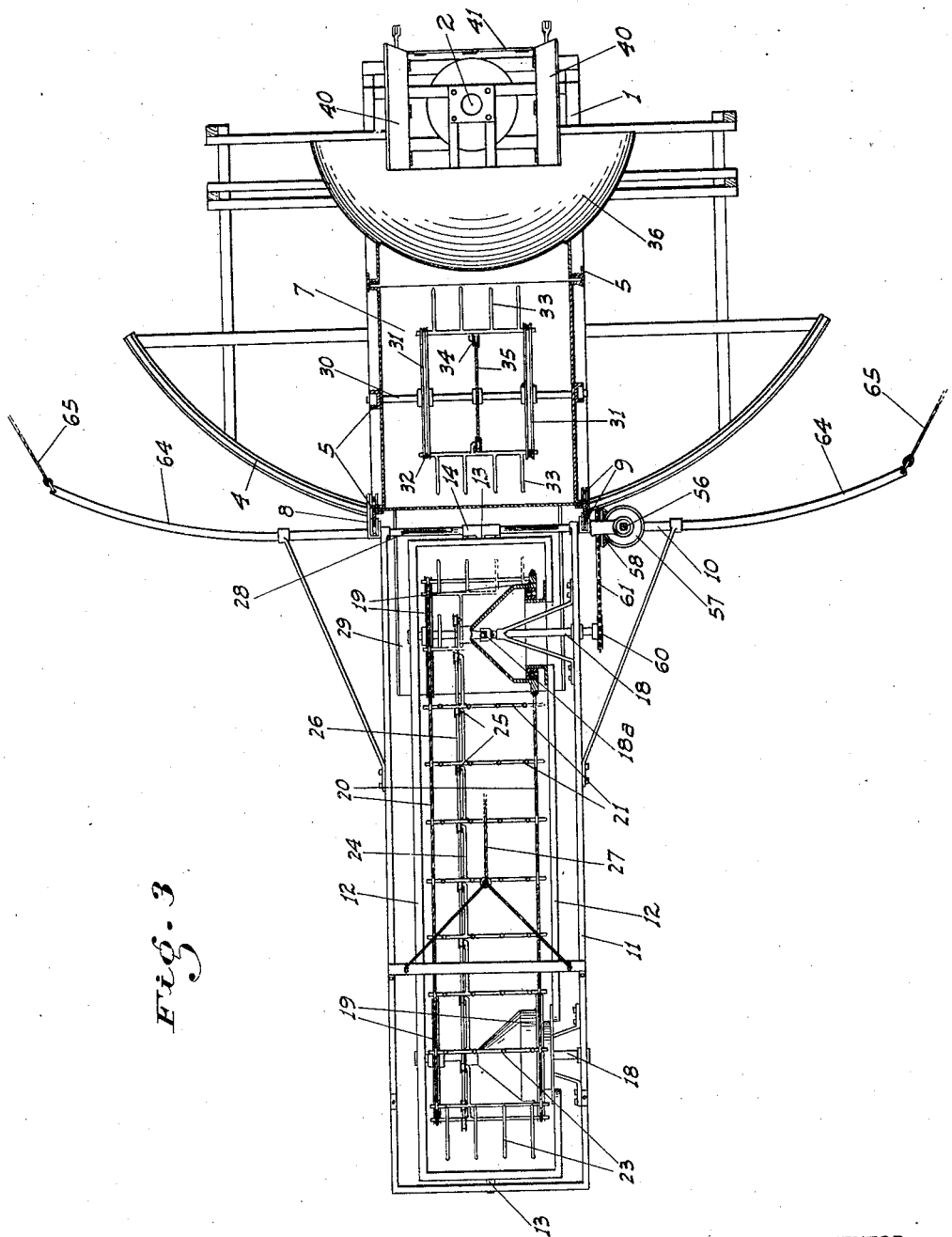
Fig. 3 is a sectional plan on the line 3—3 of Fig. 1.

The forward uprights 5 form guides for hangers 8 which have a plurality of rollers 9 mounted thereon engaging the opposite edges of the uprights. These hangers support a non-turnable shaft 10 on which are turnably mounted longitudinally extending side frames 11, which project ahead of the turntable structure a certain distance. It will therefore be seen that said frames can swing up or down about the shaft as an axis and that with the turning of the structure as a whole said frames will be swung laterally to one side or the other. Mounted in the frames 11 is a feed conveyor frame 12 supported therein for lateral tilting movement by trunnions 13 at the ends. One trunnion is mounted in the forward end member of the frames 11, while the other trunnion projects from a sleeve 14 which is turnable on the shaft 10. The frame 12 may be tilted at will relative to the supporting frame 11 by means of a worm wheel 15 mounted thereon at its forward end concentric with the trunnion and engaged by a worm 16. The worm is mounted in bearings 17 fixed onto and depending from the sleeve 14, so that when the frame 12 is swung up or down about the shaft 10 as an axis the worm and wheel will be maintained in constant mesh. Journaled at one end in one of the side frames 11 and at the other end in the opposite side member of the frame 12 are transverse and longitudinally spaced shafts 18. Each shaft is provided with a universal joint 18ª disposed on the axial line between the trunnions. This arrangement enables the frame 12 to be tilted to a certain angle in the frame 11 without interfering with the driving of said shafts from their outer ends. Fixed on those portions of said shafts which move with the frame 12 are transversely spaced sheaves 19. Passing about these sheaves 19 are endless cables 20 or the like, extending between which at intervals are bars 21. Each bar is turnably mounted in brackets 22 clamped onto the cables as shown in Fig. 7 and has a plurality of radial fingers 23 projecting outwardly therefrom. Each bar also has an arm 24 projecting therefrom in a plane different to that of the fingers, the outer end of the arm carrying a roller 25. This roller is arranged to ride on a continuous guide track member 26 of suitable character which is mounted in fixed connection with the shafts and frame 12. The roller engaging edge of the track is so shaped that the fingers on the lower runs of the cables, moving rearwardly, are held rigidly against further deflection until they reach the rear sheaves when said fingers are permitted to yield forwardly as shown in Fig. 2. This conveyor structure may be swung up or down about the shaft 10 as an axis by means of a cable 27 connected to the outer frame 11 adjacent its forward end, and raised or lowered by moving the shaft 10 up or down, by means of a cable 28 connected to said shaft. The structure for operating these cables will be described later. By means of this arrangement, however, it will be evident that by suitably positioning the conveyor, the fingers thereof may act on hay lying on the ground anywhere within the radius of swinging action of the conveyor, or extending to any reasonable height, and the hay thus acted on and engaged will be moved toward the chamber 7. The ability to tilt the conveyor fingers laterally enables the fingers to also efficiently act on a pile of hay having a transverse slope. The front lower end of the chamber is open and an apron 29 projecting outwardly from such opening is preferably provided in connection therewith to enable the hay to be better fed into the chamber. The sphere of action of the conveyor above referrd to is limited only by the length of the conveyor, the distance it may be raised from the ground, and the arc of travel it may have horizontally with the swinging of the turntable on which it is mounted.

Mounted in the chamber 7 is an elevator structure constructed as follows:

Journaled in certain ones of the beams 5 are vertically spaced shafts 30 disposed parallel to the shafts 18. On these shafts are mounted transversely spaced sheaves 31 about which pass endless cables 32 or the like. Finger units 33 are mounted at intervals on said cables, these units being the same in form and mounted as described in connection with the exterior conveyor structure:

Rollers 34 associated with said units engage a fixed track 35 which is shaped to cause the fingers to project substantially at a right angle to the cables in a rigid and non-yielding manner, except when the fingers which are disposed on the rear and upwardly moving run of the cable reach a point a predetermined distance above the lower sheaves. At such point the track curves away or inwardly of the cables as shown at 35ª to allow the fingers to yield downwardly. The cables turn in that direction such as will cause the fingers to gather the hay forced through the front opening in the chamber by the exterior conveyor, and lift such hay up the rear portion of the chamber, the fingers having a fairly close fit with the walls of the chamber. The rear wall of the chamber is opened upwardly from the point at which the fingers start to yield downwardly, as shown in Fig. 2, such opening communicating with a feed spout 36 disposed outwardly of the chamber and mounted in a fixed position relative to the turntable structure and the parts mounted thereon. The rim of the spout at the top is disposed in a plane ahead of the pivot 2 and is curved concentric with said pivot, so that when the turntable revolves and the chamber revolves likewise, the chamber opening will still register with the rim of the spout.

Mounted in a fixed position in connection with the chamber above the spout are fingers 37 arranged to project between the upwardly moving fingers 33. By means of the arrangement above described the hay will be raised to a point just above the opening of the rear chamber wall. The fingers 33 then yield downwardly, causing the load previously supported thereby to slide through said opening and into the spout. The fixed fingers 37 being positioned somewhat above said opening will cause any hay still held and engaged by the fingers 33 to be disengaged therefrom and deflected into the spout.

The spout discharges into the top of a feed box which is mounted in fixed connection therewith. This box is so located that the baling chamber of a hay press may be moved under said box with the top opening of said baling chamber then registering with and lying adjacent the bottom of the feed box. The feed box comprises a rigid front end member 38, a rigid rectangular bottom frame 39, sides 40 hinged onto the bottom frame and normally sloping outwardly therefrom, and a normally vertical upstanding door 41 hinged onto the bottom frame opposite to the member 38. This door is adapted to be swung down to a horizontal position in the box and to then cover the entire area thereof, while the sides 40 are merely adapted to be straightened up to a vertical position. Compressed air is preferably used to manipulate the sides and door by means of air cylinders 42 and 43 for the door and sides respectively; said cylinders being mounted in fixed positions relative to the movable parts and being connected to their respective parts by suitable rod and link means as shown at 44 in Fig. 6.

The power operated mechanism for the different features of the apparatus above described are mounted on the platform 6 and are preferably arranged as follows:

The source of power is preferably a gas engine 45 which operates an air compressor 46, the compressed air generated from it being retained in a tank 47. The drive shaft 48 from the engine has a pair of spaced bevel gears 49 thereon, with a clutch 50 controlled by a hand lever 51 interposed in said shaft between the gears and the engine. The lever 51 is also connected to an air valve 52 which is interposed in the pipe line 53 leading from the tank 47 to the cylinders 42 and 43. This connection is so arranged that when the lever is moved to a clutch engaging position the valve will be closed and vice versa. One of the gears 49 drives the upper shaft 30 of the elevator by suitable connection means as shown at 54 in Fig. 1; while the other gear 49 which is at the forward end of the drive shaft engages a bevel gear 55 mounted on a vertical shaft 56 which is supported in a rigid manner and so that its axis intersects that of the shaft 10. Slidably but non-turnably mounted on the shaft 56 is a bevel gear 57 which constantly meshes with a similar gear 58 turnable on the shaft 10.

Fixed in connection with the gear 58 is a sprocket wheel 59 which is transversely alined with a sprocket wheel 60 mounted on the adjacent end of the shaft 18. A chain 61 connects these two sprockets. It will therefore be seen that the shaft 18 may be driven regardless of the vertical position of the conveyor or of its longitudinal angular setting relative to the ground.

The two hay moving structures—the exterior conveyor and the enclosed elevator—will therefore be driven simultaneously and when one is halted the other will be halted also, so that there is no danger of the elevator "running dry" or of the conveyor piling up a quantity of hay in the chamber which is not being taken care of. In operation when the hay is being fed into the spout and feed box the sides and door of the latter are in their normal positions as before described, and as shown in Fig. 6. When the box is full in the judgment of the operator the clutch 50 is thrown out, immediately halting the feeding of the hay and at the same time the air is admitted to the cylinders 42 and 43 by the closing of the air valve 52. This causes the sides of the box to assume a vertical position while the door swings down to a horizontal position. This compresses the hay and forces the same down and out of the box into the hay press below. During this operation no hay will fall into the spout from above, since the elevator is stationary. When the operation is completed the clutch lever 51 is again manipulated to cause the hay feeding operations to be reassumed while the air is released from the cylinders allowing the sides and door of the feed box to reassume their normal positions.

To operate the cables 27 and 28 I mount separate drums 62 on the engine shaft, about which said cables are individually wound.

Associated with these drums are independent hand operated clutch and brake structures 63 of ordinary character, so as to enable the drums to be selectively placed in driving engagement with the engine shaft.

To turn the entire structure one way or the other about the pivot 2 as an axis I mount lateral extensions 64 on the ends of the shaft 10, to which are connected cables 65. These cables extend thence laterally over deadman blocks (not shown) and then return to drums 66 mounted on a counter-shaft 67 driven from the engine. Splined on this shaft is a hand controlled double clutch element 68 adapted to be shifted at will to alternately engage similar cooperating clutch elements provided in connection with the drums.

The hay acted on by this apparatus is preferably brought to the spot by wagons filled by means of the hay loading machine set forth in my co-pending application for patent, Serial No. 180,757, filed April 4, 1927, since this machine is capable of filling a large wagon very quickly and the continuous operation of the feeding machine is therefore assured. Owing to the great range of lateral action of the hay feeding machine a fresh supply of hay brought to the machine may be dumped on the ground at any place within the range of operations thereof without having to wait for the hay already being acted on to be exhausted.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patents is:

1. A hay feeding machine including a turntable structure, an elevator mounted on said structure, a feed box fixed relative to said structure, and a feed spout to receive hay from the elevator and deliver it to the box; the upper edge of said spout being located between the axis of rotation of the structure and the adjacent side of the elevator and being curved concentric with said axis.

2. A hay feeding machine including a supporting structure, a vertical chamber mounted thereon, an elevator in said chamber, the latter having an opening at the bottom and another opening some distance from the bottom, a feed spout into which the elevator delivers from said upper opening, and a feed conveyor mounted on said structure outwardly of the chamber to engage hay on the ground and feed it to the lower chamber opening.

3. A hay feeding machine including a turntable structure, an elevator mounted on said structure, a feed box into which said elevator delivers, and including a movable door, means for driving the elevator, means for moving the door, and control means for the elevator driving and door moving means arranged to cause the latter to function alternately.

4. A hay feeding machine including a turntable structure, an elevator mounted on said structure, a feed box into which said elevator delivers and including a movable door, means for driving the elevator, means for moving the door, control means for the elevator driving means, independent control means for the door moving means, and manually operated means interconnecting both said control means and arranged to cause the same to function alternately.

5. A hay feeding machine including a supporting structure, a feed conveyor projecting ahead of the same, means for moving said conveyor vertically, independent means for altering the longitudinal angle of the same relative to a horizontal plane, and means for swinging said conveyor laterally.

6. A hay feeding machine including a supporting structure, a feed conveyor projecting ahead of the same, means for moving said conveyor vertically, independent means for altering the longitudinal angle of the same relative to a horizontal plane, and independent means for tilting the conveyor transversely.

7. A hay feeding machine including a supporting structure, a feed conveyor projecting ahead of the same, said conveyor including an outer frame, an inner frame, and an endless hay engaging and feeding mechanism mounted in the inner frame; a transverse and vertically movable shaft on which the outer frame is pivoted, and pivot means at the ends of the inner frame between said shaft and the opposite end of the outer frame whereby to enable said inner frame to be tilted laterally.

8. A structure as in claim 7, with means for tilting and holding the inner frame rigid in any position to which it may be tilted.

9. A hay feeding machine including a supporting structure, a feed conveyor projecting ahead of the same, said conveyor including an outer frame, an inner frame, and an endless hay engaging and feeding mechanism mounted in the inner frame; including a transverse shaft, means for tilting the inner frame laterally relative to the outer frame, and means for driving said shaft from outside the outer frame irrespective of the tilt of the inner frame.

10. A hay feeding machine including a supporting structure, a feed conveyor projecting ahead of the same, said conveyor including an outer frame, an inner frame, and an endless hay engaging and feeding mechanism mounted in the inner frame; pivot means at the ends of the inner frame to permit the same to be tilted laterally in the outer frame, a transverse shaft incorporated with said feeding mechanism, said shaft being journaled in the outer frame and in the inner frame on the opposite side thereof relative to the axial line of the end pivots, a universal joint in said shaft on said axial line, and drive means applied to the portion of the shaft journaled in the outer frame.

11. A hay feeding machine including a supporting structure, a substantially horizontal conveyor mounted thereon, and means for tilting the conveyor transversely relative to the supporting structure.

In testimony whereof I affix my signature.

ANTONE J. SILVA.